(12) United States Patent
Sperandeo

(10) Patent No.: US 7,848,985 B2
(45) Date of Patent: Dec. 7, 2010

(54) MULTI-ASSET PARTICIPATION STRUCTURED NOTE AND SWAP COMBINATION

(75) Inventor: Victor Sperandeo, Dallas, TX (US)

(73) Assignee: Alpha Financial Technologies, LLC, Southlake, TX (US)

( * ) Notice: Subject to any disclaimer, the term of this patent is extended or adjusted under 35 U.S.C. 154(b) by 927 days.

(21) Appl. No.: 10/987,583

(22) Filed: Nov. 12, 2004

(65) Prior Publication Data
US 2005/0114250 A1      May 26, 2005

Related U.S. Application Data

(63) Continuation of application No. 09/275,758, filed on Mar. 25, 1999, now Pat. No. 6,922,677.

(51) Int. Cl.
G06Q 40/00   (2006.01)

(52) U.S. Cl. .......................... 705/36 R; 705/35; 705/1; 705/40; 705/37

(58) Field of Classification Search .................. 705/36, 705/35, 37, 40, 1, 39; 709/224; 463/26
See application file for complete search history.

(56) References Cited

U.S. PATENT DOCUMENTS

| | | | |
|---|---|---|---|
| 4,597,046 A | 6/1986 | Musmanno et al. | |
| 4,722,055 A | 1/1988 | Roberts | |
| 4,839,804 A | 6/1989 | Roberts et al. | |
| 5,083,782 A | 1/1992 | Nilssen | |
| 5,101,353 A | 3/1992 | Lupien et al. | |
| 5,126,936 A | 6/1992 | Champion et al. | |
| 5,193,056 A | 3/1993 | Boes | |
| 5,631,828 A * | 5/1997 | Hagan | 705/4 |
| 5,692,233 A | 11/1997 | Garman | |
| 5,797,127 A | 8/1998 | Walker et al. | |
| 5,806,048 A | 9/1998 | Kiron et al. | |
| 5,812,987 A | 9/1998 | Luskin et al. | |
| 5,819,238 A * | 10/1998 | Fernholz | 705/36 R |

(Continued)

FOREIGN PATENT DOCUMENTS

EP      0243035      10/1987

(Continued)

OTHER PUBLICATIONS

Thomas Schneeweis, "Comparisons of Commodity and Managed Futures Benchmark Indices", CISDM Working Paper Series, Aug. 2, 1996.*

(Continued)

Primary Examiner—Mary Cheung
Assistant Examiner—John H Holly
(74) Attorney, Agent, or Firm—Daniel J. Chalker; Chalker Flores, LLP

(57) ABSTRACT

The present invention provides a unitary note investment instrument and method of use that has two performance components. An investor invests in the issuer the principal amount of the investment. The first component is a base portfolio. The second component is keyed to a passive commodity index, having long and short positions. The instrument's commodity index exposure is established as the product of a leverage factor of at least 100% and the amount of the base portfolio exposure. The return to the investor comprises the change in value of both the base portfolio exposure and the commodity index exposure over a predetermined period of time multiplied by a payout factor.

30 Claims, 2 Drawing Sheets

U.S. PATENT DOCUMENTS

| | | | |
|---|---|---|---|
| 5,852,811 A | | 12/1998 | Atkins |
| 5,873,071 A | * | 2/1999 | Ferstenberg et al. ...... 705/36 R |
| 5,884,283 A | | 3/1999 | Manos |
| 5,884,285 A | | 3/1999 | Atkins |
| 5,884,286 A | | 3/1999 | Daughtery, III |
| 5,911,136 A | * | 6/1999 | Atkins ...................... 705/36 R |
| 5,946,667 A | | 8/1999 | Tull, Jr. et al. |
| 6,064,985 A | * | 5/2000 | Anderson ................. 705/36 R |

OTHER PUBLICATIONS

Philip Macalister, "Stagre Yourself Around Management", vol. 45, Issue 3, Apr. 1998.*

Barr. P., Sei Sets Passive Managed Futures Investments. Pensions & Investments, Sep. 19, 1994. p. 55.

Gray, G., Municipal Derivative Securities Uses and Valuation. Irwin Professional Publishing. 1995. pp. 151-168.

Jacob, N., Portfolio Management and Non-Traditional Investing. Trusts and Estates, Jun. 1995, pp. 14-32.

Litner, P., the Proposed Role of Managed Commodity-Financial Futures Accounts in Portfolios of Stocks and Bonds. May 16, 1983 (retrieved Jun. 1, 2000). Retrieved from the Internet: www.scaletrading.com/lintner.htm.

MacAlister, P., Share Yourself Around. Management-Auckland. Apr. 1998. vol. 45, No. 3, pp. 49-53.

Miller, T., Beating Index Funds with Derivatives. Journal of Portfolio Management. May 1999, pp. 75-76.

Money Manager Interview. Sep. 2, 1991, Wall Street Transcript Digest, vol. 1, n10.

Warsager, R., Institutions Make Their Move. Futures-Cedar Falls. Jun. 1999, vol. 28, No. 6, pp. 72-76.

Dictionary of Finance and Investment Terms, 5th Ed. John Downes and Jordan Elliot Goodman, New York: Barron (1998), pp. 80-83, 272-275, 402-403, 604-605.

The Handbook of Managed Funds, Ed. Carl Peters and Ben Warwick, McGraw-Hill (1997), pp. 8-12, 21-23,25,33,41-43.

* cited by examiner

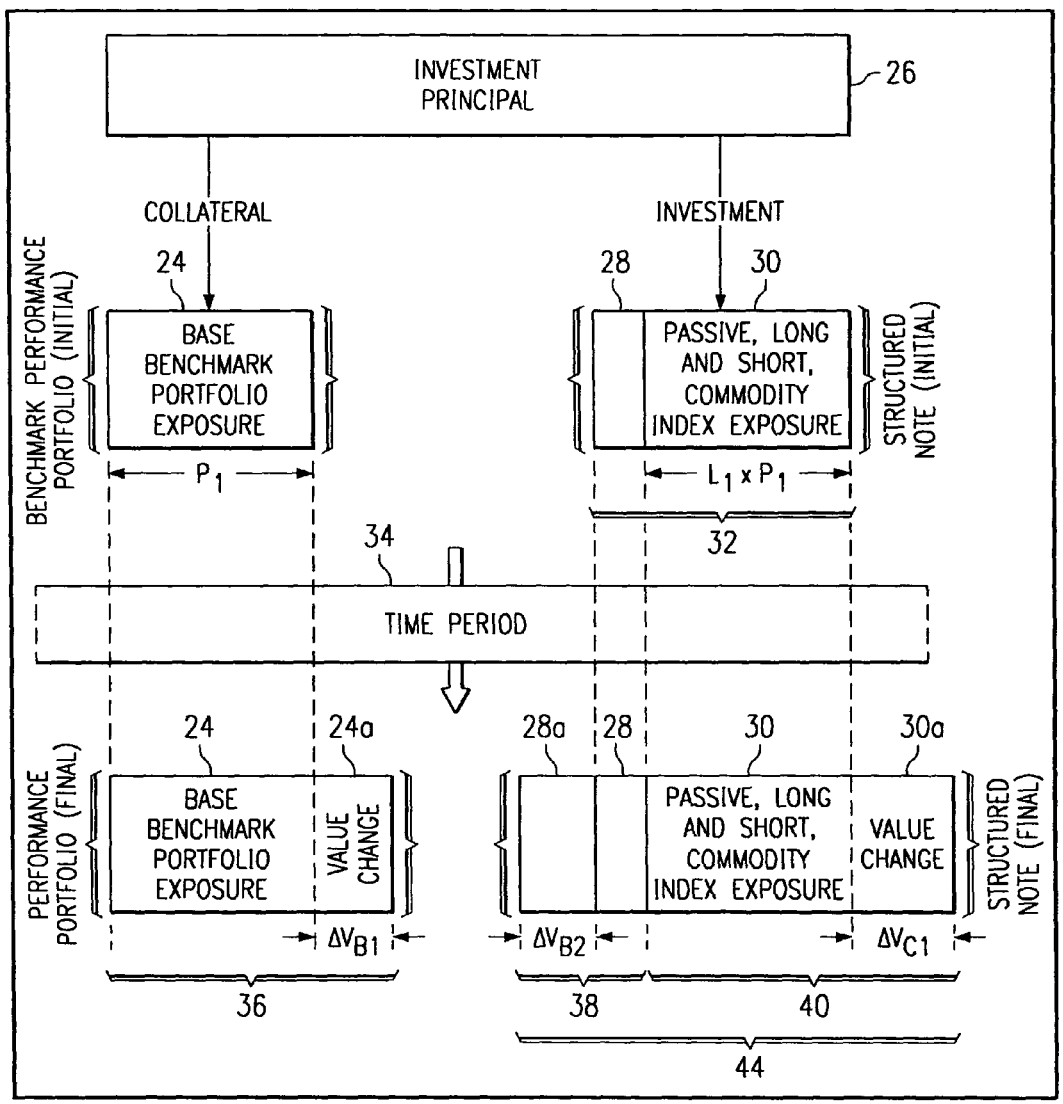

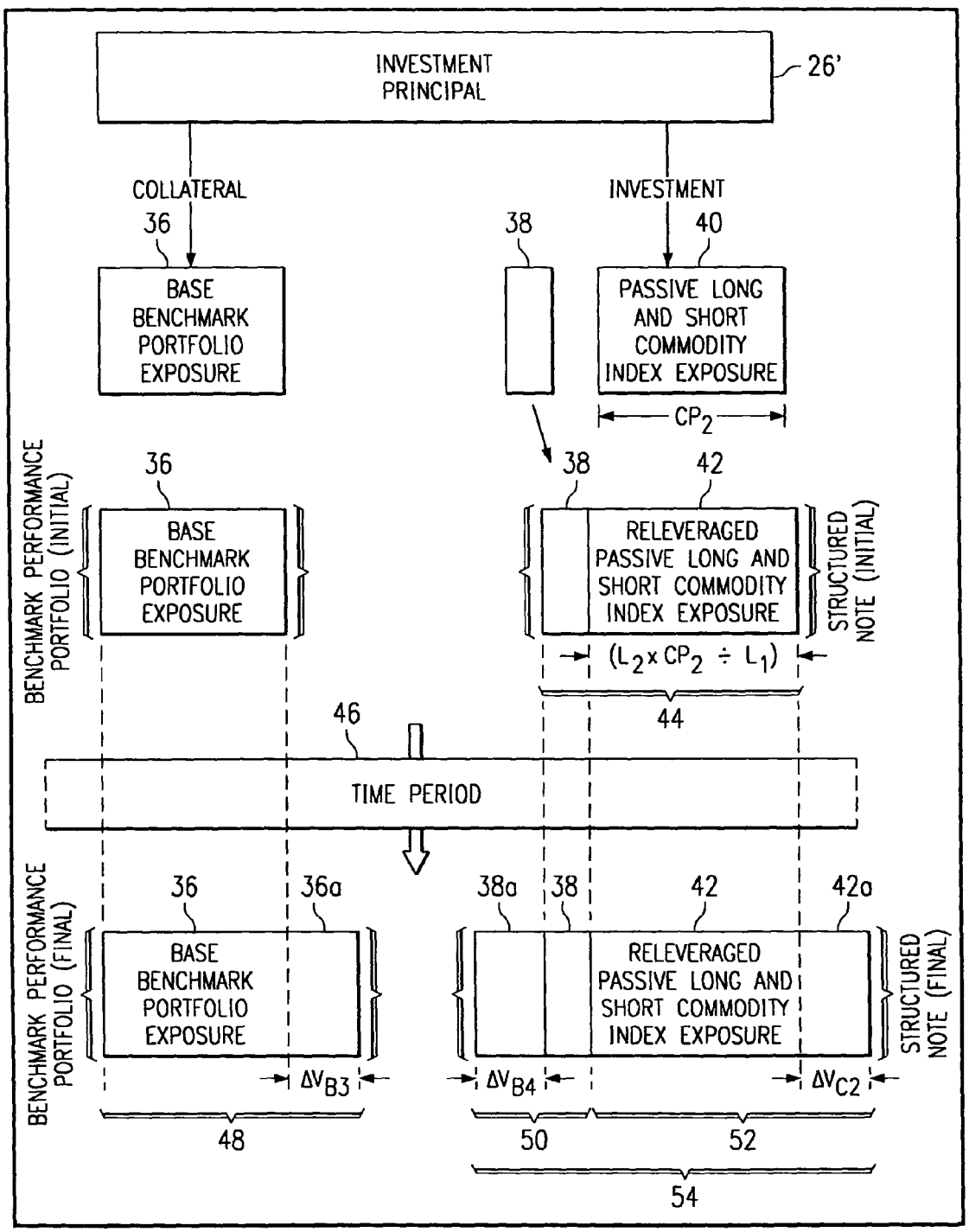

MULTI-ASSET PARTICIPATION STRUCTURED NOTE AND SWAP COMBINATION

REFERENCE TO RELATED APPLICATIONS

This application is a continuation patent application of U.S. patent application Ser. No. 09/275,758 filed on Mar. 25, 1999.

TECHNICAL FIELD OF THE INVENTION

The present invention pertains in general to financial instruments and in particular to such instruments which base their return on a combination of notional portfolios created through the use of a swap combined with a structured note.

BACKGROUND OF THE INVENTION

One of the dilemmas of contemporary money management is whether it is feasible, or worthwhile, to attempt to outperform broad-based financial indices (typically equity or debt indices) in managing a core portfolio over time. This question is of particular importance to institutional money managers who are typically evaluated on the basis of their performance compared to a broad-based market index. One aspect of this question has been whether the addition of non-traditional investment components to a traditional portfolio of stocks and bonds can reliably improve the risk/reward ratio of a portfolio by diversifying a portion of such portfolio into assets likely both to perform positively over time and in a manner generally non-correlated with the general debt and equity markets.

Financial products have increasingly emphasized the value of diversification. Modern Portfolio Theory has demonstrated that over time a diversified portfolio, by reducing the incidence of major drawdowns, can generate high cumulative returns with reduced volatility (a commonly-used measure of risk), as compared to conventional portfolios consisting of stocks and bonds. "Non-traditional" investments are incorporated into an investment strategy because they are likely to demonstrate a significant degree of performance non-correlation to a "benchmark portfolio," typically the general equity and/or debt markets. By combining non-traditional and traditional portfolio components, an "efficient frontier" of investment performance can be developed in which the addition of the non-traditional component increases returns while also reducing volatility up to the point of the desired level of portfolio efficiency (risk/reward ratio) and maximum non-traditional exposure. In the case of instruments of the present invention, the "efficiency" of the instruments designed pursuant to the invention is in large part a function of the extent to and consistency with which they outperform the selected financial benchmark.

One of the difficulties in implementing the diversification strategy of Modern Portfolio Theory has been to identify a reliably non-correlated and positively performing non-traditional investment instrument or class. Diversifying into a non-traditional investment can reduce volatility but not ultimately benefit a portfolio if the non-traditional investment is not profitable. In addition, many non-traditional investments have not, in fact, proved to be non-correlated with the broader markets, especially during periods of market stress (when the risk control benefits of diversification are potentially of the most importance).

Modern Portfolio Theory was developed in the 1950s. In the early 1960s, published financial portfolio research demonstrated that managed futures might serve as a non-traditional "asset class" for purposes of diversifying a traditional portfolio in a manner consistent with the tenets of such Theory. Since that time, while futures/commodities have been increasingly accepted as a means of diversifying traditional portfolios, the dominant approach to incorporating futures into a portfolio has focused on the use of managed futures—futures accounts actively managed by professional "Commodity Trading Advisors" and "Commodity Pool Operators." The futures markets provide efficient and leveraged access to a wide range of potentially non-correlated assets. However, the performance of managed futures products has been unreliable. Whether managed on a discretionary basis or pursuant to computer models, actively managed futures strategies have demonstrated significant periods of under-performance. Furthermore, even when a managed futures investment is successful, it is impossible to predict with any confidence what its likely near- to mid-term performance will be. This uncertainty means that it is impossible to know whether any given non-traditional investment will be (1) profitable and/or (2) non-correlated with an investor's benchmark portfolio.

A related impediment to the efficient implementation of Modern Portfolio Theory investment products through the use of non-traditional investments is that non-traditional investment portfolio managers typically regard both their strategies and their market positions as proprietary and confidential. Uncertainty of performance is combined with uncertainty as to holdings and methods of strategy implementation. These uncertainties have caused many institutions (especially those which believe that their fiduciary obligations to their investors or beneficiaries require that they have access to position data) to avoid non-traditional investments. The "entry barrier" of not providing trade transparency is heightened because most actively managed non-traditional strategies are subject to a non-quantifiable "risk of ruin"—the possibility of sudden and dramatic losses of a large percentage of an overall portfolio. In today's market environment, this is a particularly topical concern due to the massive and wholly unexpected losses suffered by a number of non-traditional, "hedge funds" in 1998, many of which had previously exhibited excellent risk/reward characteristics. "Risk of ruin" is not generally considered to be a component of traditional equity and debt investments, and can be best monitored by "real time" knowledge of strategies and positions.

Finally, non-traditional investment alternatives are frequently highly illiquid. Many non-traditional strategies have a statistically significant incremental likelihood of success the longer the time horizon of the strategy cycle. This is especially the case with relative value, quasi-arbitrage methodologies but is characteristic of many non-traditional approaches. As a result, many non-traditional investments require investment commitments of 12 months or longer, eliminating investors' ability to limit their losses or adjust portfolio exposure by terminating or reducing their investment.

The present invention provides a non-traditional investment instrument which eliminates the illiquidity and trade non-transparency, as well as a substantial component of the unpredictability, of many alternative non-traditional investments and which has produced consistently successful and non-correlated performance over 38 years of researched price histories.

The present invention is directed in particular at combining a swap instrument which achieves full exposure to a benchmark index and a structured note which adds to the overall unitary instrument structured pursuant to this investment both (i) an incremental exposure to the selected benchmark index, plus (ii) exposure to a passive, long and short, commodity index. The incremental exposure to the benchmark index provides the potential to outperform this index in favorable periods, while the commodity index exposure provides potentially valuable diversification benefits by providing access to a non-traditional exposure which avoids or reduces the illiquidity, trade transparency and unpredictability typical of actively managed non-traditional investments.

Many traditional money managers are evaluated in large part on the basis of their ability to match or exceed a benchmark index. Instruments of the present invention provide such managers with full exposure to their benchmark index through a swap on such index, plus incremental exposure to such index through the component of the structured note which is itself keyed, in part, to such index, while also providing an exposure to a passive commodity index of long and short positions. The incremental benchmark index exposure can permit instruments of the present invention to outperform the benchmark index when it is moving upwards. In fact, it would only be if the passive commodity index not only underperforms but incurs losses equal to or in excess of the incremental benchmark exposure that the unitary instrument would not outperform. In addition, the passive commodity index component of the structured note, by providing diversification from the index, provides a return which can permit the instrument to perform profitably when the index is declining, potentially contributing significantly to cumulative outperformance of the index by the unitary swap/structured note instrument. The use of the structured note also limits the overall risk of instruments of the present invention, as the structured note assures the investor the full return of the principal invested in such note after a specified period of time.

In historical simulations, the combination of a swap on one preferred embodiment of the selected benchmark for the invention—the S&P 500 Stock Index—and a structured note combining a 20% incremental exposure to the S&P 500 plus an exposure of 100%-150% to the Mount Lucas Management Commodity Index (percentage figures, in each case, are of the total amount invested in the instrument) has outperformed the S&P in all rolling 8 year periods (the duration of one preferred embodiment of instruments of the present invention) since 1961 to a significant degree.

SUMMARY OF THE INVENTION

The present invention is a unitary investment combining a swap instrument and a structured note. The swap creates a market exposure indexed to a benchmark selected by the investor to reflect the investor's portfolio needs and objectives. Because this market exposure is achieved through the use of derivatives, it can be supported entirely by the collateral of the structured note; it can also be based on a deposit of a small amount of collateral specifically designated for the swap; however, using the structured note itself as collateral for the swap—as well as an independent source of rate of return—is the preferred embodiment of instruments of the present invention, permitting a double utilization of capital. The swap provides a return to the investor equal to the benchmark index selected. This benchmark index exposure is combined with a structured note which adds an incremental exposure to the benchmark index as well as exposure to a passive commodity index portfolio of long and short positions. The passive commodity index portfolio creates an exposure in an amount substantially equal to the product of the benchmark portfolio exposure of the swap multiplied by a leverage factor which together defines a commodity index portfolio exposure. The commodity exposure may be subject to periodic leverage adjustment. The return to the investor comprises substantially the change in value of the benchmark portfolio exposure obtained through the swap, the incremental benchmark portfolio exposure obtained through one component of the structured note and the commodity index portfolio exposure obtained through the other component of the structured note, in each case over a predetermined period of time. Investors are generally guaranteed the return of the principal invested in the structured note as of the end of a specified time period.

BRIEF DESCRIPTION OF THE DRAWINGS

For a more complete understanding of the present invention and the advantages thereof, reference is now made to the following description taken in conjunction with the accompanying drawings in which:

FIG. 1 is a block diagram illustrating a swap/structured note instrument in accordance with the present invention, FIG. 2 is a block diagram illustrating the possible periodic leverage adjustment mechanism to the passive commodity index component of the swap/structured note instrument as well as how the performance of the instrument in one time period is compounded into its performance in the next.

DETAILED DESCRIPTION

The preferred embodiments of the present invention utilize two well-established and independently maintained financial indices (although it is not necessary that a financial index be used as the benchmark). These are the Standard & Poor's 500 Stock Index (referred to as the "S&P") of large capitalization U.S. stocks and the Mount Lucas Management Commodity Index (referred to as the "MLM"). Those skilled in the art will recognize that other indices can be used. For example, the S&P Diversified Trends Indicator ("DTI") can be substituted for the MLM as used herein.

The S&P is a widely-used index. It is employed in the preferred embodiments of the present invention rather than the (at least) equally familiar Dow Jones Industrial Average due to the significantly greater liquidity of derivative instruments available on the S&P. This liquidity is important to the design of instruments of the present invention because the banks and dealers which may issue these instruments reflect market liquidity (which, in turn, is directly reflected in the costs incurred by such banks and dealers in hedging their risks under the present invention instruments) in the pricing of such instruments. The higher the hedging transaction costs imposed on the issuers of the subject instruments, the lower the efficiency of these instruments to the investor.

The MLM tracks 25 different commodities/futures including 6 currencies, 3 U.S. bonds and 16 traditional commodities (collectively, the "MLM Objects"). The MLM is an unleveraged index which has been analyzed over 38 years of price histories and has been used to manage institutional accounts since 1993. It is comprised of long and/or short positions in each of the 25 MLM Objects, each with an equal dollar value, rebalanced monthly. All MLM positions are established as long or short on the basis of a straightforward trend-following model as of the beginning of each month and held until month-end; no trades occur intra-month. A long position is taken if the current spot price is above the average month-end spot price during the past 12 months (indicating an upward price trend); otherwise a short position is taken. There is no discretionary input into the MLM; consequently, it can be mathematically applied to historical market data to generate researched price histories.

The MLM does not function as an all long commodity price index. On the contrary, because it acquires both long and short positions in the various MLM Objects, the performance of the MLM is substantially non-correlated to overall commodity prices, adding a further dimension to the diversification of the instruments of the present invention.

The present invention creates, not by active management but by the application of a passive index, a non-traditional portfolio component which has a statistically very high likelihood of exceeding the performance of the selected benchmark through a wide range of different market conditions and economic cycles. The MLM is an unusual type of passive index in that unlike the standard commodities indices—the Commodity Research Bureau Index and the Goldman Sachs Commodity Index—the MLM takes both long and short positions in the different MLM Objects. In historical simulations, as well as actual institutional account performance since 1993, the results of the MLM have substantially outperformed the all-long commodities indices as well as exhibiting significantly greater diversification effects when combined with the S&P. Moreover, combinations of the MLM and the S&P, structured in accordance with the present invention, have yielded returns and risk control parameters substantially superior to the S&P considered on a stand-alone basis over periods of time generally consistent with institutional investment time horizons (8 years is one preferred embodiment of the instruments of the present invention), as well as substantially superior to many alternative combinations of non-traditional and traditional investments. In addition, even brief periods of underperformance were rare. Furthermore, due to the liquidity of the MLM Objects and the resulting ease with which the MLM can be hedged, the present invention can be provided by a large number of different banks and dealers on competitive economic terms.

An index of the type represented by the MLM is referred to herein as a passive, long and short, commodity index. The essential aspects of such an index are that (1) it is primarily based on commodities, (2) it is passive, which means it is determined by a formula rather than active management, and (3) it takes both long and short positions.

The use of a passive index eliminates any uncertainty as to how instruments of the present invention will perform under any given market scenario while also allowing total transparency of trading positions and strategies. In addition, the present invention is able to adjust to a wide range of different end-user risk/reward tolerance levels by permitting wide flexibility in adjusting both initial leverage and the ratio of the benchmark portfolio exposure (both base and incremental) to the instrument's passive, long and short, commodity index portfolio exposure. Once initially calibrated, instruments of the present invention perform robotically in accordance with the performance exposure and risk components designed into the initial parameters, although they can be varied if so desired by the investor during the term of the investment.

Investment instruments pursuant to the preferred embodiments of the present invention are internally diversified when considered as a stand-alone (unitary) investment, each combining the S&P and the MLM. In addition, the overall investment instrument represents a diversification from traditional portfolio components. Specifically, however, the present invention has been directed to meeting the portfolio objectives of institutional money managers who are themselves focused on outperforming (or at least not underperforming) a particular financial index. The unitary combination of the swap and structured note in instruments of the present invention is particularly designed to outperform the selected benchmark due to the instrument's incremental benchmark exposure (as well as the potentially profitable exposure of the instrument's passive commodity index) in favorable markets and through its potentially non-correlated passive commodity index performance in unfavorable benchmark markets.

Investors may be able to redeem investments of the present invention at any time (subject to the imposition of a redemption charge in the case of the structured note component of the unitary investment instrument). The ability to redeem combined with total trade transparency provides investors with a layer of risk control unavailable in most non-traditional investment alternatives.

Because of the passive character of the indices incorporated in the present invention, if is also possible to fix the costs applicable to these instruments at the time each instrument is designed. Changes in market conditions subsequent to product inception have no effect on the pricing to the investors. This eliminates the risk that a material increase in market volatility (and, accordingly, the hedging cost to the issuer of an instrument of the present invention) will result in a commensurate increase in embedded costs, and corresponding degradation of investment potential. Actively managed non-traditional investments, on the other hand, can be subject to extreme variability of costs, a feature which is especially unacceptable to institutional investors when they are denied access to the trade information necessary to monitor the actual level of transactions being executed.

The performance of the MLM cannot be predicted in the abstract; however, given any assumed market movements, this performance can be determined with high probability. This enables investors to apply market sensitivity analysis—a basic method of quantifying market risk exposure—to the positions held by the instruments of the present invention with a high degree of accuracy. On the other hand, it is not possible to conduct reliable market sensitivity, "value at risk" or Monte Carlo simulation market exposure analysis on most actively managed alternative investment products. The "risk of ruin" in instruments of the present invention can be clearly quantified; in most non-traditional investments it is effectively unknowable.

Statistical analysis also indicates a remarkably high degree of non-correlation between the S&P, as well as other securities market indices, and the MLM throughout a wide range of different market cycles.

The use of the MLM in combination with an investor's benchmark index addresses many of the difficulties encountered to date in incorporating non-traditional investments as a "mainstream" component of traditional portfolios, while also designing a non-traditional investment specifically adopted to institutional investors' need to outperform (or at least not underperform for any significant period) selected financial indices.

FIGS. 1-2 generally indicate a progressive time period going from the top to the bottom of each Figure. The base benchmark exposures, the incremental benchmark exposure and the passive, long and short, commodity index portfolio exposure are separated horizontally although they are part of the unitary investment instruments of the present invention.

Referring to FIG. 1, there is illustrated a swap/structured note instrument 20 in accordance with the present invention. The instrument 20 comprises a swap component and a note component. The swap component comprises a base benchmark portfolio exposure 24. The note component comprises an incremental benchmark exposure 28 and a passive, long and short, commodity exposure 30. An investor who wishes to utilize the swap/structured note instrument 20 with a specified face amount invests that amount as investment principal 26 in the structured note. The structured note at once serves as collateral for the swap component and as the investment in the note. The base benchmark portfolio exposure 24 is acquired through the swap (further described below). The initial base benchmark exposure 24 is generally equal to the face amount of the instrument 20.

The preferred method of financing the instrument 20 is for the investor to provide the investment principal 26 in a dollar amount to equal the note component which in turn provides full collateral to the swap component, which is of equal face value to that of the note component. The investment principal that forms the base portfolio exposure may be any financial instrument, e.g., stocks, bonds, T-bills, cash, currencies, mortgages, any other security, or a combination thereof.

An investor may select to provide separate collateral, such as a part of his own portfolio, for the swap component of the instrument 20 with separate investment principal for the note component.

The issuer of the structured note (typically also the issuer of the swap) guarantees the return of the investment principal 26 as of the end of a specified period (8 years in one preferred embodiment). The investment principal 26 is used to acquire the incremental benchmark portfolio exposure 28 and the passive long and short commodity index exposure 30 which is equal to the benchmark portfolio exposure 24 multiplied by a leverage factor $L_1$. An overall structured note exposure 32 comprises incremental benchmark portfolio exposure 28 and commodity index exposure 30.

The return provided to the investor is measured by a performance exposure portfolio which comprises the benchmark portfolio exposure 24 and the combination of the incremental benchmark portfolio exposure 28 and the passive, long and short, commodity index exposure 30. The face amount of the benchmark portfolio exposure 24 is identified by the term $P_1$. The face amount of the passive commodity index exposure 30 is the product of a leverage factor $L_1$ and the benchmark portfolio exposure 24 ($P_1$). The face amount of the incremental benchmark portfolio exposure 28 is a fraction of the benchmark portfolio exposure 24 (in one preferred embodiment, 20%).

The leverage factor $L_1$ is determined by a formula that is based on the performance of the selected commodity index used for the commodity exposure 30. If the commodity index performance in the preceding 12 months (or other period of time) equaled or exceeded 15% (in the case of the MLM under market conditions in late 1998; using a different commodity index and/or under different market conditions, this figure could vary from 15%), $L_1$ is selected to be 100%, but if the total performance of the selected commodity index is less than 15% during the preceding 12 months (or other period of time), the leverage factor $L_1$ is selected to be 150%. These are preferred leverage factors, but other leverage factor values may also be used.

The swap/structured note instrument 20 includes a predetermined time period 34 which preferably is one year. Typically, the instrument 20 is not terminated at the end of one year, but is reset as further described with reference to FIG. 2.

The initial performance portfolio for the swap instrument 20 comprises the benchmark portfolio exposure 24, the incremental benchmark portfolio exposure 28 and passive, long and short, commodity index exposure 30. After the time period 34 has elapsed, the final performance portfolio comprises a final benchmark portfolio exposure 36 and a combination incremental benchmark portfolio and a passive, long and short, commodity index exposure 44. The base benchmark portfolio exposure 36 has two components which are the initial base benchmark portfolio 24 and a value change 24a. The structured note exposure 44 has four components which are the initial incremental benchmark exposure 28, a value change 28a for exposure 28, the initial commodity index exposure 30, and a value change 30a for exposure 30.

The combination of exposures 28 and 28a comprises an exposure 38. The combination of exposures 30 and 30a comprises an exposure 40.

The return for the time period 34 has three components. The first comprises the base benchmark portfolio value change 24a, which is expressed as the term $\Delta V_{B1}$. The second comprises the incremental base benchmark portfolio value change 28a which is expressed as the term $\Delta V_{B2}$, and the third is the passive, long and short, commodity index value change 30a, which is expressed as the term $\Delta V_{C1}$. Thus, the return on the swap instrument 20 for the time period 34 is represented by the sum of $\Delta V_{B1}$ plus $\Delta V_{B2}$ plus $\Delta V_{C1}$.

At the end of the time period 34, the passive commodity index exposure 40 of structured note (indicated as 20') is subject to releveraging as illustrated in FIG. 2.

The amount of investment principal 26' as of the beginning of time period 46 equals the initial investment principal 26 plus $\Delta V_{B1}$, plus $\Delta V_{B2}$, plus $\Delta V_{C1}$. Although the base benchmark portfolio exposure has increased by $\Delta V_{B1}$, the increase in investment principal provides adequate collateral for this increased exposure.

The initial base benchmark portfolio exposure 36 as of the beginning of time period 46 is the final benchmark portfolio 36 at the end of time period 34. Similarly, the initial incremental benchmark exposure 38 as of the beginning of time period 46 is the final incremental benchmark exposure 38 at the end of time period 34. The final passive commodity index exposure 40 (from FIG. 1) is, however, subject to releveraging at the beginning the second time period 46.

TABLE 1

UNITARY SWAP/STRUCTURED NOTE INSTRUMENT
MARKET SECTOR ALLOCATIONS
Percentages Are of Total Portfolio Exposure

| | S&P (Benchmark Portfolio; assumes 20% Incremental Benchmark Exposure) | |
|---|---|---|
| Equities (Base Benchmark plus Incremental Benchmark) | 54.0% | 44.0% |

| | MLM (Passive, Long and Short, Commodity Index Portfolio) | |
|---|---|---|
| | 100% Leverage | 150% Leverage |
| Bonds | 5.46% | 6.68% |
| Currencies | 10.92% | 13.35% |
| Energy | 7.28% | 8.89% |
| Grains | 9.10% | 11.11% |
| Other Agricultural | 7.28% | 8.89% |
| Metals | 5.46% | 6.68% |
| | 100.00% | 100.00% |

Percentages are of Amounts Invested in the Unitary Swap/Structured Note Instrument.

The releveraging to produce the commodity index exposure 42 at the beginning of time period 46 is effected using the same formula utilized initially to determine the leverage factor for the commodity index exposure 30, as described above in reference to FIG. 1. The ending value of the passive commodity index portfolio 40, represented by $CP_2$, is divided by the leveraging factor $L_1$ used at the beginning of time period 34 to calculate a "unit" of passive commodity index exposure.

That unit is then multiplied by the new leverage factor $L_2$, determined as previously described, to establish the commodity index portfolio exposure 42 for time period 46. For the present example, the initial leveraging factor applied in determining the commodity index exposure 30 is referenced as $L_1$, which may be assumed to be 100%. If the newly-calculated leverage factor $L_2$ is assumed to be 150%, then the passive commodity index exposure 42 will be 1.5 times as large as the passive commodity index exposure 40 and also greater than the initial passive commodity index exposure 30 (barring a greater than ⅓ loss in the passive, long and short, commodity index exposure in time period 34). If the value of the passive commodity index portfolio exposure 40 is represented by $CP_2$, the passive commodity index exposure 42 is determined by the formula, exposure $42=(L_2 \times CP_2 \div L_1)$. If $L_1$ and $L_2$ are respectively 100% and 150%, then the value of exposure 42 will be $1.5 \times CP_2$. Should the original value of $L_1$ be 150% and $L_2$ be 100%, then exposure 42 will be 0.66% of $CP_2$.

Upon expiration of the second time period 46, there is a value change 36a ($\Delta V_{B3}$) in the base benchmark portfolio exposure 36, a value change 38a ($\Delta V_{B4}$) in the incremental benchmark portfolio exposure 38 and a value change 42a in the commodity index portfolio exposure 42.

After the expiration of the time period 46, there is produced a final benchmark portfolio exposure 48 includes the basic component exposure 36 and a value change 36a, which is represented by the term $\Delta V_{B3}$. Similarly, following the completion of time period 46, there is produced an incremental benchmark portfolio 50 having a basic component 38 and a value change 38a $\Delta V_{B4}$ and a final passive, long and short, commodity index exposure 52 comprising the basic component exposure 42 and a value change 42a, which is represented by the term $\Delta V_{C2}$. The combination of exposures 50 and 52 is a final structured note exposure 54.

The return to the investor over time period 46 equals $\Delta V_{B3}$ plus $\Delta V_{B4}$ plus $\Delta V_{C2}$.

The leverage factor applied to generate the commodity index exposure 42 can be constant, the same as was applied to generate commodity index exposure 30, or it can be the result of the changes in the leverage factor effected periodically over the life of the note instrument 20' with releveraging performed as described above in reference to FIG. 2.

The note component of the instrument 20 can have a payout factor which can be 100%, or more or less than 100%, of the notional changes 28a and 30a. The payout factor is set at the initiation of the instrument 20. The payout factor number generally depends on the volatility of the underlying basis and nominal rates at the time.

A numerical example of an instrument of the present invention is as follows.

Assume that $10 million is invested in the unitary swap/structured note instrument 20, this $10 million is the investment principal 26 which is invested in the structured note exposure 32 as well as serving as collateral for the swap component (exposure 24).

The initial base benchmark portfolio exposure 24 ($P_1$) would represent a $10 million S&P exposure in one preferred embodiment of the present invention. Similarly, the incremental benchmark portfolio 28 could represent a $2 million S&P exposure in such embodiment. Assuming that the initial leverage factor $L_1$ is 100%, the initial passive long and short commodity index exposure 30 would be $10 million.

If during the initial time period 34 the S&P exposure 24 increases 10% and the MLM exposure 30 increases 5%, the value change 24a in the base benchmark portfolio exposure 24 would be $1 million and the value change 28a in the incremental portfolio exposure 28 would be $0.2 million. The value change 30a in the passive commodity index exposure 30 would be $0.5 million. Consequently, the total return to the investor in time period 34 would be $1 million ($\Delta V_{B1}$), plus $0.2 million ($\Delta V_{B2}$) plus $0.5 million ($\Delta V_{C1}$), for a total of $1.7 million. The value of exposure 40 at the end of time period 34 is $10.5 million.

At the beginning of time period 46 the base benchmark portfolio exposure 36 would equal $11 million, and the incremental benchmark portfolio exposure 38 would equal $2.2 million. Assuming that the leveraging factor applied to the passive long and short commodity index portfolio 40 ($CP_2$) as of the beginning of time period 34 was $L_1$ rather than $L_2$ and that $L_2$ was 150% rather than 100%, the releveraged commodity index exposure 42 would equal 150% ($L_2$)×$10.5 million ($CP_2$)÷100% ($L_1$), or $15.75 million. The overall exposure 44 of the structured note component would, accordingly, equal the incremental benchmark portfolio exposure 38 of $2.2 million plus $15.75 million 42, or $17.95 million.

If in the time period 46 the S&P exposure 24 increases 5% and the MLM exposure 30 increases 10%, the value change 36a in the base benchmark portfolio 36 would equal $0.55 million, the value change 38a in the incremental portfolio exposure 38 would equal $0.11 million and the value change 42a in the releveraged commodity index exposure 42 would equal $1.575 million. Consequently, the total return to the investor over time period 46 would be $0.55 million ($\Delta V_{B3}$) Plus $0.11 million ($\Delta V_{B4}$) plus $1.575 million ($\Delta V_{C2}$), or $2.235 million. The new base benchmark portfolio exposure 48 would equal $11.55, the new incremental benchmark portfolio exposure 50 would equal $2.31 million and the new passive long and short commodity index exposure 52 would be $12.075 million (subject to releveraging as of the beginning of a time period 3).

The return of $2.235 million is based on a payout factor of 100%. Had the payout factor been different, the return would be changed proportionately.

If a unitary swap/structured note instrument is held to maturity, an investor will receive back not only the performance of the instrument ($\Delta V_{B1}$ plus $\Delta V_{B2}$ plus $\Delta V_{C1}$ in time period 34; $\Delta V_{B3}$ plus $\Delta V_{B4}$ plus $\Delta V_{C2}$, in time period 46, etc.), but also the amount of the original investment principal 26, however, losses can result in a loss of principal from the base benchmark portfolio exposure 24.

A reporting and accounting system can provide daily and intra-day trading positions and net asset value information directly to investors, as well as calculating all fees embedded in the investment instruments. Moreover, as will be recognized by those skilled in the art, computers and computer systems and the associated software currently used in the investment, banking and trading industries can be adapted to create, design, manage, monitor, trade, report and otherwise implement the financial investments, instruments and methods described herein without the need for undue experimentation.

It is not necessary that the investor acquire the "benchmark portfolio" (base or incremental) component of the investment instrument as a part of the instrument itself. The benchmark portfolio may comprise a pre-existing portfolio held by an investor. Furthermore, an investor need not maintain a static benchmark portfolio during the term of the investment instrument. Changing the make-up of the benchmark portfolio will affect the overall results achieved, but this is not inconsistent with the invention.

The investment instruments of the present invention may be evaluated by portfolio managers as internally diversified, stand-alone investments as well as in terms of constituting non-traditional investment alternatives providing the potential for diversifying a traditional portfolio. These instruments are also specifically designed for portfolio managers who are directed towards equaling or exceeding the performance of a given (typically, but not necessarily, financial) benchmark. One of the preferred embodiments of the instruments of the present invention is an 8 year instrument combining the S&P and the MLM; this embodiment has outperformed, in historical price research, the S&P in all rolling 8 year periods since 1961.

The parties involved in structuring the swap/structured note instruments, marketing these instruments, consulting and managing the releveraging processes (and possible recalibrating or rebalancing decisions), monitoring net asset values and issuing the swap/structured note instruments will receive a variety of fees from the investors. In certain cases, these fees may be paid directly by investors, outside of their investment in an instrument; in other cases, these fees will be deducted from the amount invested. These fees may include percentage fees based on the benchmark exposure of an instrument, or only on the commodity index component thereof, as well as percentage fees based on the actual Net Asset Value of the instrument. Percentage fees may generally be assumed to range up to 3% per annum in total, but will vary on a case-by-case basis. Incentive fees based on the performance of an overall instrument, calculated either periodically or over the entire term of the investment, may also be charged, and may be calculated over a hurdle rate reflecting the performance of the benchmark portfolio. These fees may generally be assumed to range from 15%-25%, but will vary on a case-by-case basis. There will also be a monthly charge to reflect the issuer's costs of adjusting its hedges to reflect the monthly internal rebalancing of the MLM by executing the corresponding trades in the futures markets. A licensing fee of approximately 0.5 of 1% per annum is also payable for the use of the MLM, and, in the case of the structured note component of the instrument, there is an indirect cost in the form of the loss of any interest earned on the investment principal (investors being guaranteed only the return of the principal of the structured note component, not any interest, as of the maturity date).

All fees and charges are subject to individual negotiation, as well as in the case of certain fees, to market conditions at the time an instrument is issued. For example, the monthly charge reflecting the hedging costs associated with the MLMs internal rebalancing as well as the payout factor are both directly affected by market volatility.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. A computerized investment product comprising:
   a benchmark performance portfolio of assets having a benchmark portfolio exposure;
   a computer that manages a leverage portfolio comprising a commodity index portfolio, of long and short positions, having a commodity index portfolio exposure equal to the benchmark portfolio exposure multiplied by a leverage factor of at least 100%;
   wherein the benchmark performance portfolio and the leverage portfolio together reduce the risk while increasing the return of the investment product as compared to the benchmark performance portfolio alone.

2. The investment product as recited in claim 1, further comprising an incremental benchmark portfolio of assets having an incremental benchmark portfolio exposure.

3. The investment product as recited in claim 2, wherein the incremental benchmark portfolio exposure is less than or equal to 20% of the benchmark portfolio exposure.

4. The investment product as recited in claim 2, wherein the incremental benchmark portfolio exposure is less than or equal to 50% of the benchmark portfolio exposure.

5. The investment product as recited in claim 1, further comprising a return comprising a change in value of the benchmark performance portfolio and the commodity index portfolio over a predetermined time period.

6. The investment product as recited in claim 1, further comprising an investment principal that is invested in the commodity index portfolio and serves as collateral for the benchmark performance portfolio.

7. The investment product as recited in claim 6, wherein the investment principal invested is returned to an investor by an issuer at the end of a predetermined time period.

8. The investment product as recited in claim 6, wherein the investment principal comprises stocks, bonds, T-bills, cash, currencies, mortgages, any other security, or a combination thereof.

9. The investment product as recited in claim 1, wherein the commodity index portfolio exposure is releveraged to an amount which is a function of the commodity index portfolio exposure and a second leverage factor.

10. The investment product as recited in claim 1, wherein the benchmark portfolio is keyed to an equity index.

11. The investment product as recited in claim 10, wherein the equity index comprises the S&P 500 Stock Index.

12. The investment product as recited in claim 1, wherein the commodity index portfolio is keyed to the S&P Diversified Trends Indicator.

13. The investment product as recited in claim 1, wherein the leverage factor is a function of the performance of the commodity index portfolio over a selected period of time.

14. The investment product as recited in claim 13, wherein the leverage factor is a first predetermined number if the commodity index portfolio has had a specified return over the selected period of time and is a second predetermined number if the commodity index portfolio has not had the specified return over the selected period of time.

15. The investment product as recited in claim 14, wherein the first predetermined number is at least 100% and the second predetermined number is greater than the first predetermined number.

16. The investment product as recited in claim 1, wherein the leverage factor is at least 50%.

17. The investment product as recited in claim 1, wherein the leverage factor is less than or equal to 300%.

18. A computer adapted to manage an investment product comprising:
   a computer;
   data stored on the computer that corresponds to the investment product;
   the investment product comprising (a) a benchmark performance portfolio having a benchmark portfolio exposure, and (b) a leverage portfolio comprising a commodity index portfolio, of long and short positions, having a commodity index portfolio exposure equal to the benchmark portfolio exposure multiplied by a leverage factor of at least 100%;
   wherein the benchmark performance portfolio and the leverage portfolio together reduce the risk while increasing the return of the investment as compared to the benchmark performance portfolio alone; and wherein the computer creates, structures, issues, monitors and reports information about the investment product.

19. A computerized investment product comprising:
a benchmark performance portfolio of assets having a benchmark portfolio exposure;
an incremental benchmark portfolio of assets having an incremental benchmark portfolio exposure less than or equal to 50% of the benchmark portfolio exposure;
a computer that manages a leverage portfolio comprising a commodity index portfolio, of long and short positions, having a commodity index portfolio exposure equal to the benchmark portfolio exposure multiplied by a leverage factor of at least 100%;
wherein the benchmark performance portfolio and the leverage portfolio together reduce the risk while increasing the return of the investment as compared to the benchmark performance portfolio alone;
an investment principal that is invested in the commodity index portfolio, serves as collateral for the benchmark performance portfolio and is returned to an investor by an issuer at the end of a predetermined time period;
a return comprising a change in value of the benchmark performance portfolio and the commodity index portfolio over the predetermined time period.

20. The investment product as recited in claim 19, wherein the investment principal comprises stocks, bonds, T-bills, cash, currencies, mortgages, any other security, or a combination thereof.

21. The investment product as recited in claim 19, wherein the commodity index portfolio exposure is releveraged to an amount which is a function of the commodity index portfolio exposure and a second leverage factor.

22. The investment product as recited in claim 19, wherein the benchmark portfolio is keyed to an equity index.

23. The investment product as recited in claim 22, wherein the equity index comprises the S&P 500 Stock Index.

24. The investment product as recited in claim 19, wherein the commodity index portfolio is keyed to the S&P Diversified Trends Indicator.

25. The investment product as recited in claim 19, wherein the leverage factor is a function of the performance of the commodity index portfolio over a selected period of time.

26. The investment product as recited in claim 25, wherein the leverage factor is a first predetermined number if the commodity index portfolio has had a specified return over the selected period of time and is a second predetermined number if the commodity index portfolio has not had the specified return over the selected period of time.

27. The investment product as recited in claim 26, wherein the first predetermined number is at least 100% and the second predetermined number is greater than the first predetermined number.

28. The investment product as recited in claim 19, wherein the leverage factor is at least 50%.

29. The investment product as recited in claim 19, wherein the leverage factor is less than or equal to 300%.

30. A computer adapted to manage an investment product comprising:
a computer;
data stored on the computer that corresponds to the investment product;
the investment product comprising (a) a benchmark performance portfolio of assets having a benchmark portfolio exposure, (b) an incremental benchmark portfolio having an incremental benchmark portfolio exposure less than or equal to 50% of the benchmark portfolio exposure, (c) a leverage portfolio comprising a commodity index portfolio, of long and short positions, having a commodity index portfolio exposure equal to the benchmark portfolio exposure multiplied by a leverage factor of at least 100%, (d) an investment principal that is invested in the commodity index portfolio, serves as collateral for the benchmark performance portfolio and is returned to an investor by an issuer at the end of a predetermined time period, and (e) a return comprising a change in value of the benchmark performance portfolio and the commodity index portfolio over the predetermined time period;
wherein the benchmark performance portfolio and the leverage portfolio together reduce the risk while increasing the return of the investment product as compared to the benchmark performance portfolio alone; and
wherein the computer creates, structures, issues, monitors and reports information about the investment product.

* * * * *